No. 723,531. PATENTED MAR. 24, 1903.
W. B. JACKSON.
APPARATUS FOR CONDENSING SMOKE, FUMES, OR GASES.
APPLICATION FILED JULY 12, 1901.
NO MODEL. 2 SHEETS—SHEET 1.

WITNESSES:

INVENTOR.
W. B. Jackson

ATTORNEY.

UNITED STATES PATENT OFFICE.

WILLIAM B. JACKSON, OF DENVER, COLORADO, ASSIGNOR TO THE SMOKE EXTERMINATOR AND FUME CONDENSER COMPANY, OF PUEBLO, COLORADO.

APPARATUS FOR CONDENSING SMOKE, FUMES, OR GASES.

SPECIFICATION forming part of Letters Patent No. 723,531, dated March 24, 1903.

Application filed July 12, 1901. Serial No. 68,098. (No model.)

*To all whom it may concern:*

Be it known that I, WILLIAM B. JACKSON, a citizen of the United States of America, residing at Denver, in the county of Arapahoe and State of Colorado, have invented certain new and useful Improvements in Apparatus for Condensing Smoke, Fumes, or Gases; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in means for condensing smoke, fumes, and gases from furnaces, ore-roasting plants, and smelters, whereby the carbon and solids are separated from the smoke, fumes, &c., and discharged into the sewer or caught in receptacles when it is desired to save the carbon or recover the metallic or other values.

My present invention may be considered an improvement on the construction set forth in my previous application, Serial No. 46,021, filed February 4, 1901. In the construction set forth in the said application no provision is made for draft by way of the smoke-stack. My present object is to open communication between the condensing-tank and the stack for draft purposes and at the same time prevent the escape of smoke or deleterious fumes or gases. To this end a conduit leads from the condensing-tank to the stack above the closed damper, and a filter is interposed in the tank between the inlet for the smoke and fumes and the outlet communicating with the stack. This filter is sufficiently porous to afford the necessary draft and of such construction as to prevent the escape of carbon and also to neutralize, purify, and render harmless the escaping gases. I further make provision for confining the smoke, fumes, and gases as they enter the condensing-tank by way of the inlet within certain limits, whereby they may be acted on more advantageously by the spray of water within the tank.

The invention will now be described in detail, reference being made to the accompanying drawings, in which is illustrated an embodiment thereof.

Figure 1:
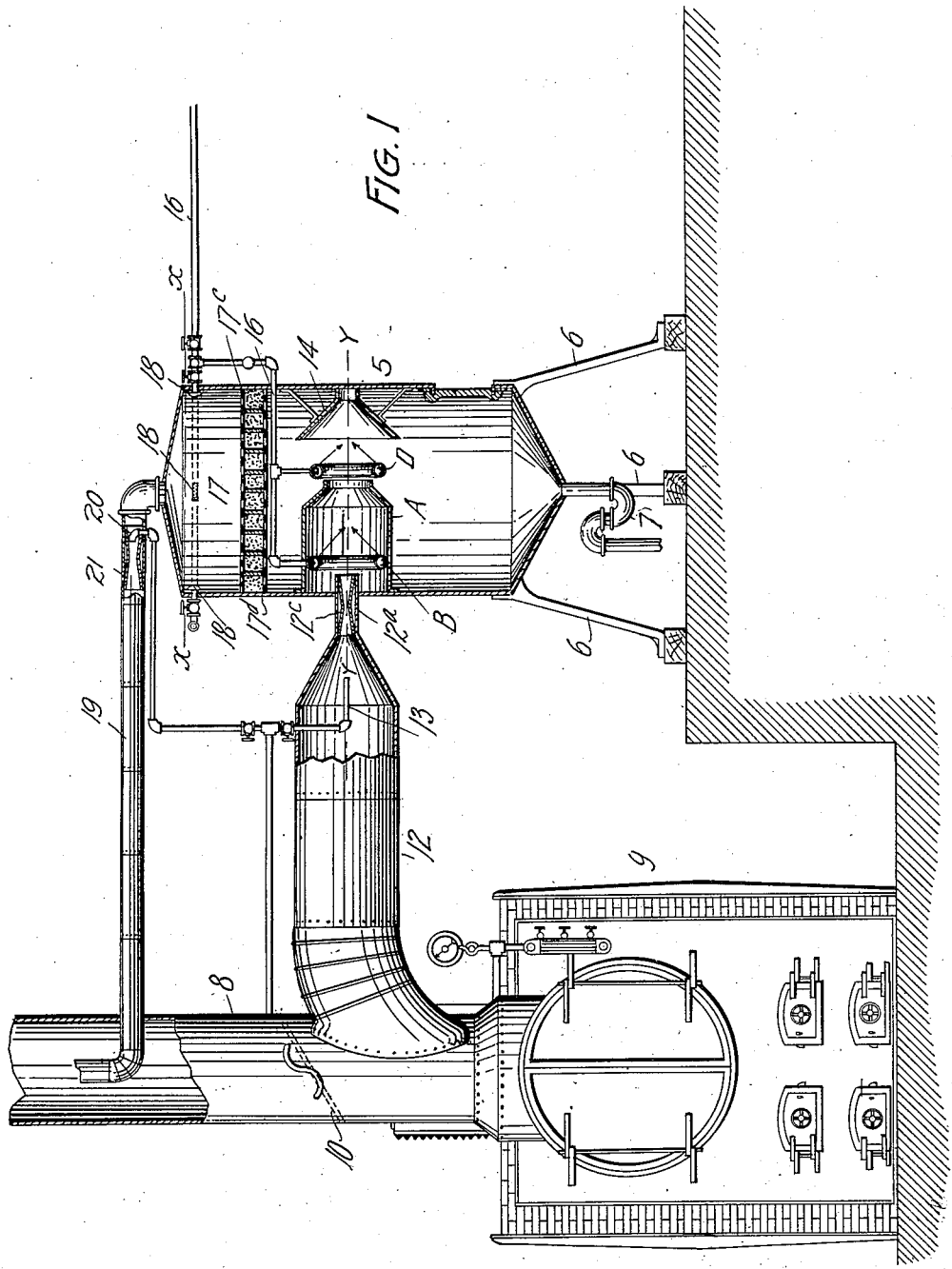
Figure 2:
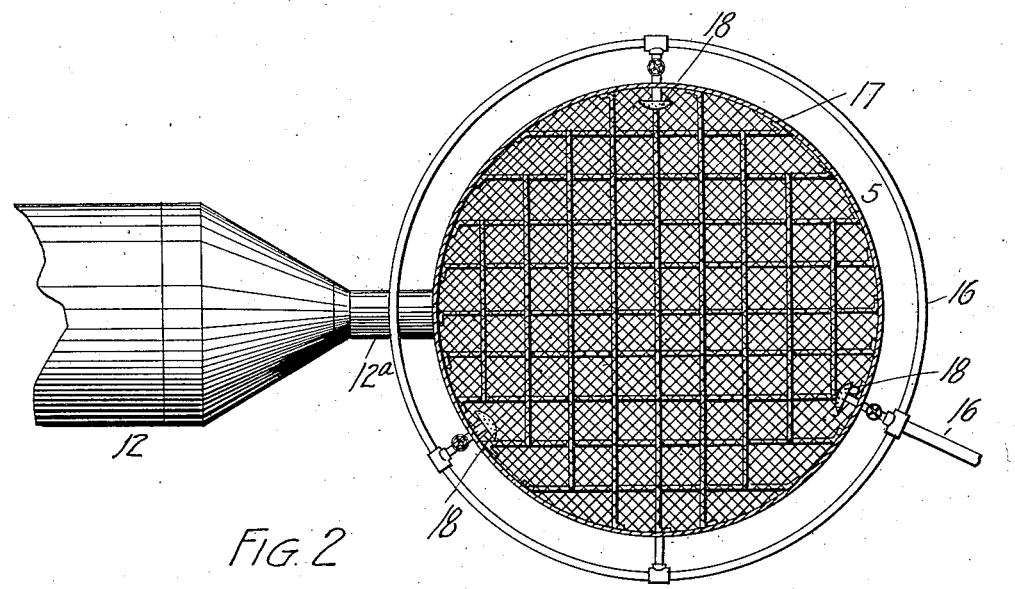
Figure 3:
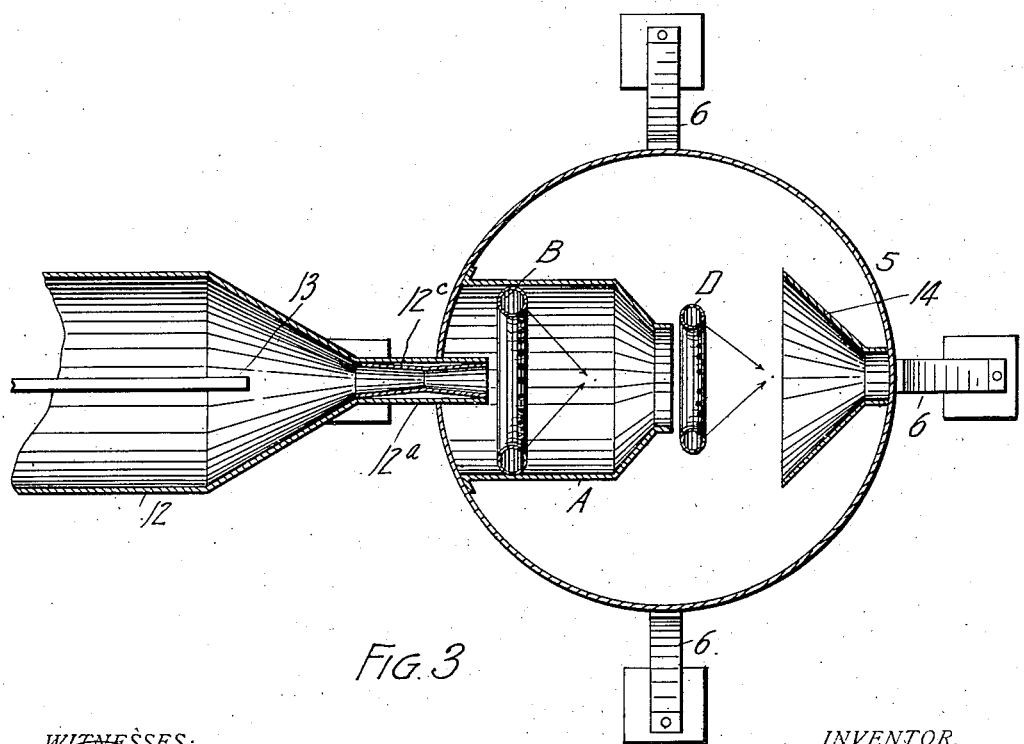

In the drawings, Figure 1 is a vertical longitudinal section taken through the condensing-tank, the furnace being shown in end elevation. Fig. 2 is a cross-section taken on the line $x$ $x$, Fig. 1. Fig. 3 is a cross-section taken on the line $y$ $y$, Fig. 1. In Figs. 2 and 3 the parts are shown on a larger scale.

The same reference characters indicate the same parts in all the views.

Let the numeral 5 designate a tank mounted on suitable legs 6. This tank has a sloping bottom provided with a trapped outlet 7, which may be connected with the sewer or arranged to discharge into a suitable receptacle, as may be desired. The stack 8 of the furnace 9 is provided with a damper 10, which, as shown in the drawings, is closed. Below this damper a conduit 12 communicates with the stack at one extremity and with the condensing-tank at the opposite extremity. The extremity $12^a$ of the conduit connected with the condensing-tank is reduced in size and a steam-pipe 13 enters the conduit and discharges a jet of steam toward the condensing-tank to facilitate the rapidity of the smoke discharge and increase the draft. Within the reduced portion $12^a$ of the conduit is inserted a sleeve $12^c$, which is contracted in the middle and increases in size toward its extremities. The conduit extremity $12^a$ may be made the shape of the sleeve, in which event only one part would be required. It is preferred, however, to make the two parts $12^a$ and $12^c$, since the size of the part $12^c$ may be varied at pleasure and as circumstances may require, while the part $12^a$ remains of uniform size. The part $12^c$ is made to fit the part $12^a$ so tightly that it is held securely in place by frictional contact. It may be detached at will, however, and a sleeve inserted whose center shall be more or less contracted, as desired.

Located within the tank and surrounding the discharge extremity of the inlet-conduit is a larger pipe or auxiliary conduit A, secured to the inner wall of the tank and carrying a spraying device B, which, as shown in the drawings, consists of a perforated tube or pipe of a size corresponding with the inner circumference of the pipe A and located in a plane passed transversely through the pipe A, just in front of the discharge extremity of the conduit 12ᵃ. The perforations of this spraying device are so arranged that the issuing spray-jets focus within the tank at a point located a short distance in front of the discharge-conduit, whereby the products of combustion to be condensed are most advantageously acted on by the spray. In front of the pipe A, which terminates approximately in the center of the tank, is located another similar spraying device D. The pipe A may be contracted at its inner extremity, as shown in the drawings, or made full size its entire length, as may be desired. On the side of the tank directly opposite the smoke-pipe entrance and the pipe D is mounted a funnel-shaped receiver 14, whose function is to receive and temporarily suspend the smoke, fumes, and gases as they issue from the tube 12, whereby condensation is facilitated.

The spraying devices B and D are connected with a pipe 16, leading from a suitable water-supply source.

Arranged transversely in the tank above the devices just described is a filter 17. Above the filter is located a number of spraying devices 18, connected with the water-supply source. In the top of the tank is a draft-opening from which leads a conduit 19 back to the stack, with which it communicates above the damper. In this conduit 19 is introduced a small pipe 20, connected with the boiler and arranged to discharge a jet of steam in the direction of the smoke-stack for the purpose of increasing the draft.

The smoke is driven into the tank with such velocity and force that it instantly unites with the water and steam, and the resulting products fall to the bottom of the tank and are carried off through the open water-trap 7 into the sewer or to any suitable receptacle in case it is desired to recover the carbon. The action of the water and steam on the smoke is both mechanical and chemical. The gases from smelters and ore-roasting furnaces will unite with water and may be discharged into the sewer. If they contain mineral values, the water may be drawn off into suitable receptacles and the values precipitated at will. By reason of the velocity of the discharge through the conduit 12 the smoke, fumes, and gases are carried across the tank into the receiver 14, which temporarily suspends the said products and gives the water and steam an opportunity to act upon them more effectively, whereby condensation is facilitated.

The filter prevents the escape of any carbon to the stack by way of the draft-pipe, and it also purifies the gases which pass therethrough. The water from the sprays 18 absorbs a portion of the gases which pass through the filter. This water also passes through the filter and prevents it from becoming clogged with impurities.

The product obtained from the smoke and fume condenser when Southern Colorado coal is used as fuel gave by careful analysis the following result: bitumen, 33.37 per cent.; carbon, 55.63 per cent.; ash, 3.62 per cent.; moisture, 4.35 per cent.; volatile, 3.03 per cent.; total, one hundred per cent.

The result will of course vary with the different coals used as fuel.

The details of construction for the filter are immaterial so long as it performs the function stated. As shown in the drawings, it is composed of a series of crossed plates or bars 17ᵃ, whose extremities are secured to the inner wall of the tank. A screen 17ᶜ is placed above the bars and another screen 17ᵈ below the bars. The spaces or cells between the screens and formed by the plates or bars are filled with any suitable filtering material, as coke broken or granulated to give the desired filtering effect.

The conduit 19 is preferably provided with a centrally-contracted sleeve 21, located between the stack and the steam-jet pipe 20 and in suitable proximity to the latter to further increase the draft.

Having thus described my invention, what I claim is—

1. In a smoke and fume condenser, the combination of a condensing-tank, a conduit for introducing smoke and fumes into the tank, a larger auxiliary conduit, mounted in the tank and surrounding the inlet, and a spraying device located within and carried by the auxiliary conduit.

2. In a smoke and fume condenser, the combination of a condensing-tank, a conduit for introducing smoke and fumes into the tank, a larger auxiliary conduit, mounted in the tank and surrounding the inlet, a spraying device located within and carried by the auxiliary conduit, and another spraying device located within the tank at the discharge extremity of the auxiliary conduit.

3. In a smoke and fume condenser, the combination of a condensing-tank, a conduit for introducing smoke and fumes into the tank, a larger auxiliary conduit, mounted in the tank and surrounding the inlet, and a spraying device located within and carried by the auxiliary conduit, and arranged to focus its jets in front of the discharge-conduit.

4. In a smoke and fume condenser, the combination of a condensing-tank, a conduit for introducing smoke and fumes into the tank, a larger auxiliary conduit mounted in the tank and surrounding the inlet, and a spraying device located within the auxiliary conduit and consisting of a tube bent into circular form and perforated substantially as described.

In testimony whereof I affix my signature in presence of two witnesses.

WILLIAM B. JACKSON.

Witnesses:
A. J. O'BRIEN,
MARY C. LAMB.